Jan. 3, 1928.  
C. W. WEISS  
1,655,079  
TRANSMISSION  
Filed April 29, 1927.  2 Sheets-Sheet 1
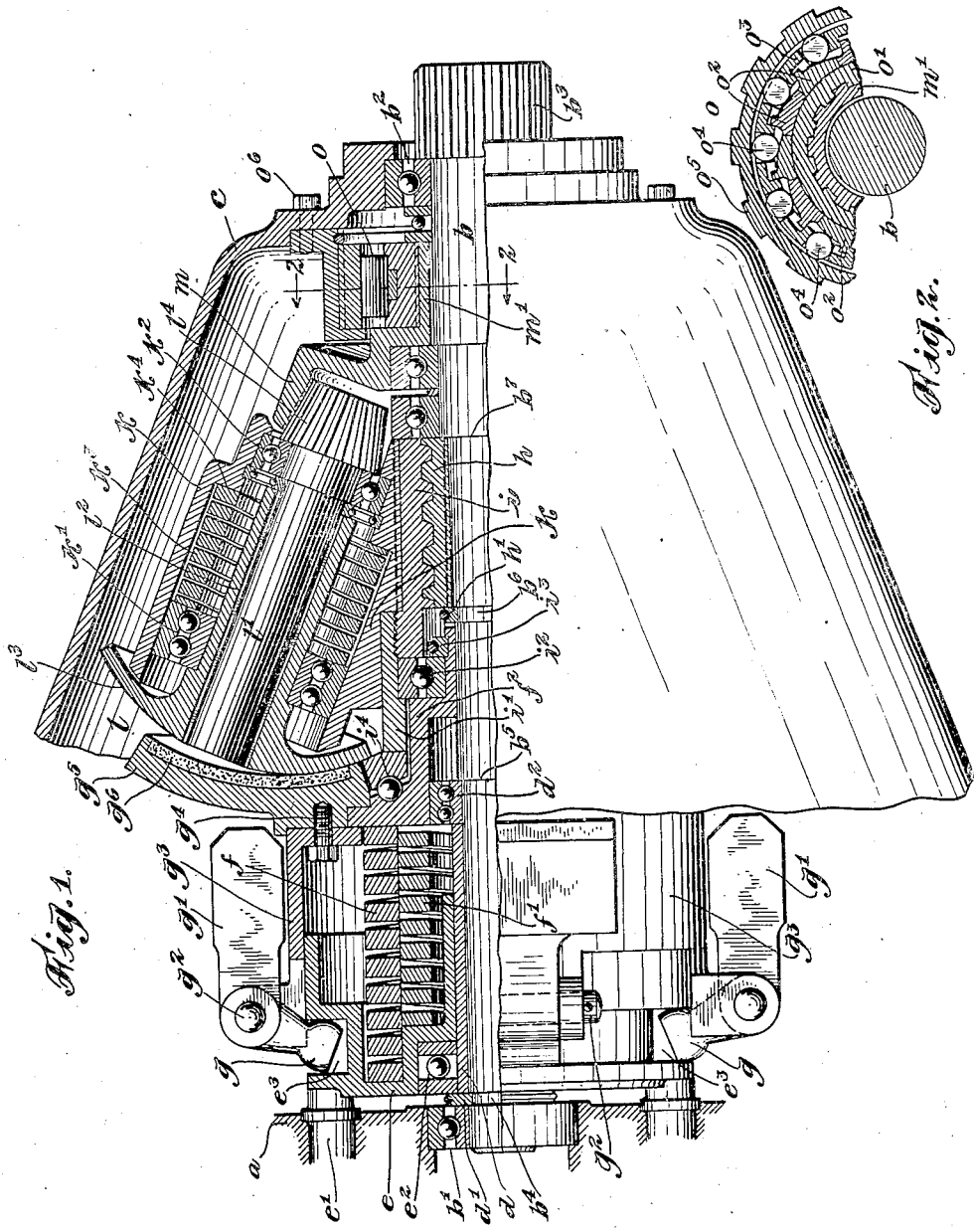
INVENTOR  
Carl W. Weiss  
BY  
Redding, Greeley, O'Shea & Campbell  
ATTORNEYS Jan. 3, 1928. 1,655,079
C. W. WEISS
TRANSMISSION
Filed April 29, 1927 2 Sheets-Sheet 2

INVENTOR
Carl W. Weiss
BY
Redding, Greeley, O'Shea & Campbell
ATTORNEYS

Patented Jan. 3, 1928.

1,655,079

UNITED STATES PATENT OFFICE.

CARL W. WEISS, OF BROOKLYN, NEW YORK.

TRANSMISSION.

Application filed April 29, 1927. Serial No. 187,474.

The general object of this invention is to produce an improved torque controlled, variable speed, power transmission. In such transmissions the product of speed and torque for the driven shaft remains constant. To begin with a 1:1 speed ratio (commonly known as high gear in automobile transmissions), implies that the normal speed ratio as between the driving shaft and the driven shaft is also 1:1, the driven shaft, when freed of control, returning automatically to the speed of the driving shaft. Without the introduction of a device, such as a torque and centrifugal force control, by which the transmission mechanism is returned automatically, when freed of control, to low gear, this would mean that the car or other mechanism to be driven must be started from a condition of rest at the high speed ratio instead of the torque multiplying low gear ratio. The mechanism in which the present invention resides is so designed as to meet this primary requirement and also to effect disengagement between the driving member and the driven member so as to permit the motor to idle under normal conditions, thereby making unnecessary the provision of a manually controlled clutch. The speed at which the motor may idle, that is, without driving engagement with the driven member, having been predetermined, an increase of the motor speed will bring about driving engagement but at a low speed ratio with a maximum torque. With the decrease of resistance, as the car or other mechanism gets under way, the speed ratio will increase gradually and continuously until the motor attains its most desirable speed and horse power output. Likewise, if the torque of the driven member increases and approaches the motor torque, it reacts on the transmission to change the speed ratio, also gradually and continuously, so that the increased resistance shall be overcome at a reduced speed. Obviously there must be a relatively stationary point of reactance which preferably takes the form of a one-direction roller bearing, one member of which is fixed.

The improved construction by which all of these conditions are met will be fully explained hereinafter with reference to the accompanying drawings, in which is illustrated a convenient and practical embodiment of the invention and in which:

Figure 1 is a view partly in elevation and partly in longitudinal central section of a transmission mechanism which embodies the invention.

Figure 2 is a detail view in section on the plane indicated by the broken lines 2—2 of Figure 1, illustrating particularly the construction of the reaction device.

Figure 3:
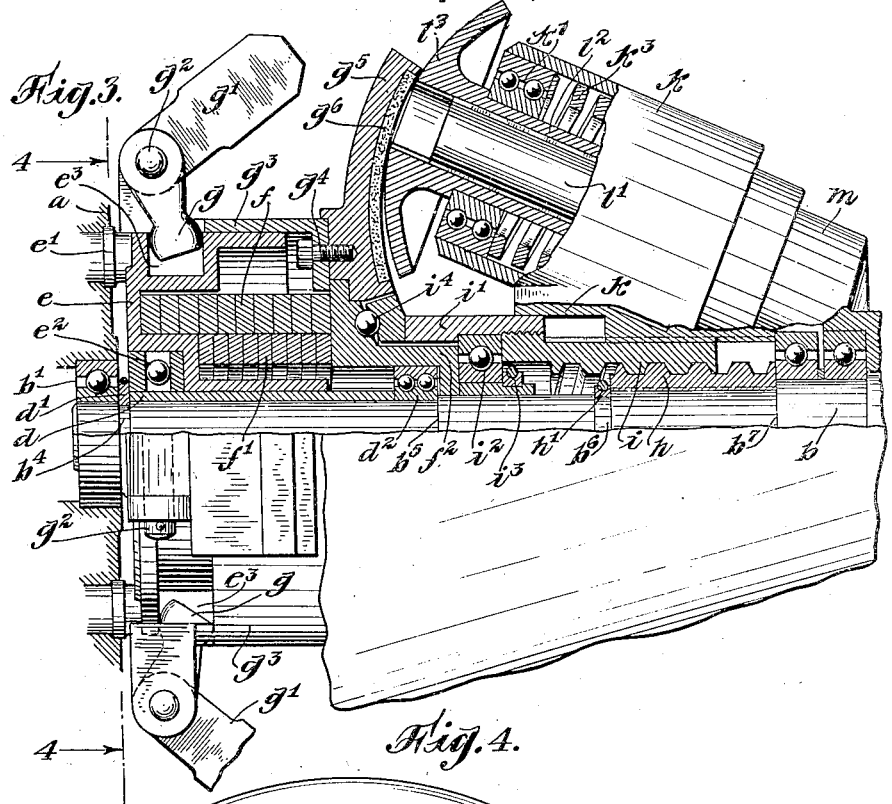
Figure 3 is a partial view generally similar to Figure 1, but showing the parts in different positions.
Figure 4:
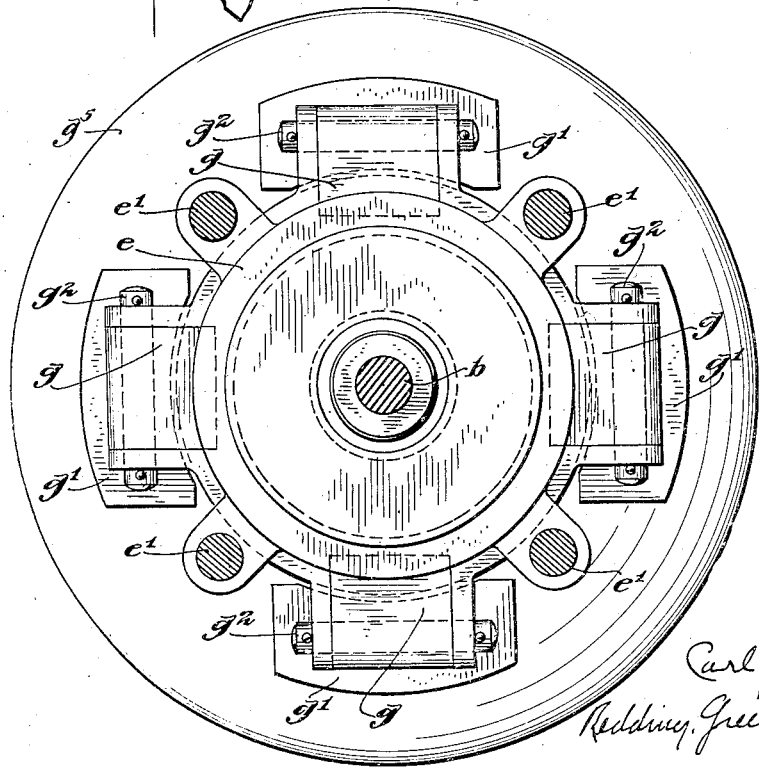
Figure 4 is a view in sectional elevation on the plane indicated by the broken line 4—4 of Figure 3.

In the embodiment of the invention illustrated in the drawings, the driving element is indicated in a fragmentary manner as the fly-wheel $a$ of a motor. The several parts of the transmission are shown as supported on the driven shaft $b$, which is shown as having a bearing at one end, as at $b'$, in the fly-wheel $a$, and at the other end, as at $b^2$, in the fixed housing $c$, the shaft $b$ being shown as provided with a transmitting pinion $b^3$. Mounted loosely on the shaft $b$ is a sleeve $d$, which is held from longitudinal movement by a split ring $d'$ at one end, the split ring being seated in an annular groove $b^4$ in the shaft $b$, and at the other end by the inner ring of a bearing $d^2$, such inner ring abutting against a shoulder $b^5$ of the shaft $b$. Mounted on the sleeve $d$ is an element $e$ which is shown as engaged through studs $e'$ with the fly-wheel $a$ so as to rotate therewith, forming in effect a part of the driving element. This element $e$ has at $e^2$ a thrust bearing, which may rest against the split ring $d'$. The element $e$ forms an abutment for the stiff, spiral springs $f$, $f'$ which bear at their other ends against a sleeve-like member $f^2$ which is supported on the bearing $d^2$ above mentioned and on the shaft $b$ with freedom for limited endwise movement from the position shown in Figure 1 toward the driving element, as shown in Figure 3. The driving element $e$, as it may be regarded for convenience, is recessed externally as at $e^3$, to receive the arms $g$ of one or more centrifugal weights $g'$, which are pivotally mounted, as at $g^2$, on a sleeve-like member $g^3$, which is supported on the driving element $e$ with capacity for longitudinal movement under the influence of the centrifugal weights against the pressure of the springs $f$, $f'$. Secured to the sleeve-like member $g^3$, as by screw bolts $g^4$, is an annular member $g^5$ which is formed on one side with a concave contact face, which may be surfaced with a suitable frictional material, as indicated at $g^6$.

Splined on the shaft $b$ is a sleeve $h$ which is held from longitudinal movement by a split ring $h'$ received in a groove $b^6$ of the shaft $b$, at one end of the sleeve, and by a shoulder $b^7$ of the shaft $b$ at the other end of the sleeve. The sleeve $h$ is formed externally with a helix or coarse screw-thread and is engaged by a corresponding sleeve $i$, the latter being capable of limited longitudinal movement with respect to the sleeve $h$ but rotating with the sleeve $h$ when it has reached the limit of its longitudinal movement in either direction. The sleeve $i$ has secured thereto an extension $i'$, which is supported through a bearing $i^2$ on the sleeve-like member $f^2$, the bearing $i^2$ being held from longitudinal displacement on the sleeve-like member $f^2$ by a split ring $i^3$. The extension $i'$ also bears, through a thrust bearing $i^4$ at its end, against a flange of the sleeve-like member $f^2$.

Mounted on the sleeve $i$ and its extension $i'$ and splined thereto so as to rotate therewith, is a mutor carrier $k$ which is shown as chambered cylindrically to support, through bearings $k'$ and $k^2$, the mutor $l$ and to receive a stiff spiral spring $k^3$ which, having an abutment against a shoulder $k^4$ of the mutor carrier and resting at its other end against the bearing $k'$, exerts an outward pressure upon the mutor. The mutor comprises a shaft $l'$, on which is splined a sleeve $l^2$ which carries at its outer end a spherical head $l^3$ for cooperation with the concaved annular member $g^5$. At its inner end the shaft $l'$ carries a pinnion $l^4$.

An internal gear $m$, mounted loosely on the shaft $b$ through a hub $m'$, meshes with the pinnion $l^4$ for the purpose of providing a reaction device. As shown, the gear $m$ is held in fixed relation, in one direction of rotation, through connection with the fixed housing $c$ by means of a one-direction roller clutch bearing $o$, which may be constructed as shown in Figure 2, and more particularly described in application for Letters Patent of the United States, Serial No. 179,734, filed March 31, 1927, comprising an inner member $o'$ which may be splined on the hub $m'$, a locking ring made up of a series of blocks $o^2$ formed each with an inclined surface, a spacing ring $o^3$, rollers $o^4$, and an outer member $o^5$ which is shown as secured to the housing $c$, as by bolts $o^6$. It will be understood that a slight movement of the inner member $o'$ and the locking ring $o^2$ in a clockwise direction, as seen in Figure 2, forces the rollers against the stationary outer member so that the internal gear $m$ is thereby held from rotation and furnishes a point of reactance for the mutor, while free rotation of the internal gear $m$ is permitted in the opposite direction.

When the motor is rotating at a speed which does not exceed a predetermined idling speed, the driving element $e$ also rotates at the idling speed at which the centrifugal action is not sufficient to throw the centrifugal members $g'$ outward against the reaction of the springs $f$, $f'$. The annular driving member $g^5$ therefore occupies its extreme right-hand position, as shown in Figure 1, and the mutor $l$ also occupies its extreme retracted position, as shown in the same figure. Under these circumstances the extreme edge of the spherical head $l^3$ of the mutor is in driving contact only with the adjacent ring of the bearing $i^4$, which itself rotates freely, so that the spherical head of the mutor is not rotated upon its own axis. As the ring of the bearing $i^4$ is free, no power is transmitted through the mutor to the driven element when this condition obtains.

When, however, the speed of the motor and the driving element $e$ is increased slightly above the idling speed, the action of the centrifugal weights $g'$, by reason of the engagement of the arms $g$ in the recess $e^3$ of the non-longitudinally movable driving element $e$, causes the sleeve-like member $g^3$, on which the centrifugal weights are mounted, to move toward the left against the pressure of the springs $f$, $f'$, such movement of the sleeve-like member $g^3$ effecting like movement of the annular concave contact member $g^5$. The spherical head $l^3$ of the mutor $l$, under the influence of the spring $k^3$, follows the movement of the annular concave contact member $g^5$ in contact therewith. As the annular contact member moves in a direction parallel with the axis of the shaft $b$, and as the spherical head $l^3$ of the mutor moves outward in a direction at an angle with or divergent from the line of the axis of the shaft $b$, the contact of the edge of the spherical head $l^3$ will be shifted from the free ring of the bearing $i^4$ to the inner edge of the annular contact member $g^5$, where such contact member has its lowest linear velocity. If the speed of the motor is increased to its maximum, so that the centrifugal weights $g$ are thrown out to the positions shown in Figure 3, completely compressing the springs $f$, $f'$, the annular contact member will be moved thereby to the position shown in Figure 3 and the spherical head of the mutor will make contact with the annular contact member, as shown in Figure 3. When the edge of the spherical head of the mutor makes contact with the inner edge of the annular contact member $g^5$, which is then rotating at a relatively slow speed, but at a speed slightly above the idling speed, the spherical head of the mutor will be caused to rotate upon its own axis and the pinion $l^4$ will be caused thereby to roll in engagement with the internal gear $m$, thereby carrying the mutor in revolution about the axis of the shaft $b$, but at a slow speed, it being understood that the gear $m$ is then held against rotation by the action of the one-direction clutch $o$ and thus establishes a point of reaction, by reason of which the mutor is compelled to revolve about the axis of rotation of the driving element. Under the influence of the torque of the driven element, as when the resistance of the driven element is increased, the limited relative rotation of the two sleeves $i$ and $h$ will move the sleeve $i$ to the right and will move the contact member $g^5$ to the right also, thereby changing the relation of the spherical head of the mutor and the contact member in opposition to the centrifugal action of the weights $g'$. When this is accomplished, the relative movement of the sleeve $i$ will cease and the two sleeves $i$ and $h$ will rotate together, the sleeve $h$ carrying with it in its rotation the shaft $b$ or driven element at a torque multiplying low gear ratio. As the speed of the motor increases and the annular contact member is moved to the left, as to its extreme position, indicated in Figure 3, the contact between the annular contact member and the spherical head of the mutor will shift to the position shown in Figure 3, in which position the spherical head, being in contact with the contact member at points on opposite sides of its own axis, will cease to rotate on its own axis and the mutor will revolve about the axis of the driven shaft, carrying with it the sleeve $i$, sleeve $h$ and shaft $b$ at the same speed of rotation as that of the driving element, the speed ratio being then 1:1.

When the spherical head of the mutor ceases to rotate on its own axis and the pinion $l^4$ therefore ceases to rotate on its own axis, the internal gear $m$ will then be carried in the same direction as the direction of revolution of the mutor, the one-direction ball clutch $o$ permitting then such free rotation of the gear $m$.

The foregoing description of the operation of the transmission has relation only to the progression from a condition of rest to a 1:1 speed ratio, but the operation under different conditions will be understood readily. If it be assumed that the transmission is applied to an automobile and that the 1:1 speed ratio has been attained on a smooth surfaced, level road and that the automobile has entered upon an upward incline, with increase of resistance, such that greater driving torque is desirable for its propulsion, the action of the helix $i, h$, due to the torque of the driven element is such that the contact member $g^5$ will be moved to the right, the mutor head $l^3$ will also be moved to the right with a consequent relative displacement of the contact member and the mutor, by reason of their angular relation, from the relation shown in Figure 3 toward the relation shown in Figure 1 with a reduction of the speed of the driven element and an increase of driving torque.

It will be understood that various changes in details of construction and arrangement may be made to suit different conditions of use and that, except as pointed out in the accompanying claims, the invention is not restricted to the particular construction shown and described herein.

I claim as my invention:

1. A power transmission device comprising a driving element, a contact member rotatable therewith, a mutor adapted to have driving contact with the contact member, said contact member and said mutor being relatively displaceable to vary the speed transmitted from one to the other and the torque, centrifugal devices to effect such relative displacement, a reaction device in operative relation with the mutor, and a driven element in operative relation with the mutor.

2. A power transmission device comprising a driving element, a contact member rotatable with the driving element, a mutor revoluble about an axis external to itself and having a contact head rotatable about an axis inclined with respect to the axis of revolution and adapted to have driving contact with the contact member, a pinion carried by the mutor and rotatable with the contact head, a gear in engagement with the said pinion, means to prevent rotation of said gear in one direction while permitting free rotation thereof in the opposite direction, and a driven element in operative relation with the mutor.

3. A power transmission device comprising a driving element, a contact member rotatable therewith, a driven shaft coaxial with the driving element and the contact member, a mutor adapted to have driving contact with the contact member, said conact member and said mutor being relatively displaceable to vary the speed transmitted from one to the other and the torque, a mutor carrier concentric with said shaft, a coarsely threaded sleeve fixed to said shaft, a coarsely threaded sleeve carried with the mutor carrier in engagement with the first named sleeve, and a reaction device in operative relation with the mutor.

4. A power transmission device comprising a driving element, a contact member rotatable therewith, a driven shaft coaxial with the driving element and the contact member, a mutor adapted to have driving contact with the contact member, said contact member and said mutor being relatively displaceable to vary the speed transmitted from one to the other and the torque, means to effect such displacement a mutor carrier concentric with said shaft, a coarsely threaded sleeve fixed to said shaft, a coarsely threaded sleeve carried with the mutor carrier in engagement with the first named sleeve, and a reaction device in operative relation with the mutor.

5. A power transmission device comprising a driving element, a contact member rotatable therewith, a mutor having a rotatable head adapted to have driving contact with the contact member, means to effect relative displacement of the contact member and said head, a pinion rotatable with the mutor head, a mutor carrier concentric with the driving element, a coarsely threaded sleeve fixed to the mutor carrier, a driven shaft, a coarsely threaded sleeve fixed to the driven shaft and engaged by the first named sleeve, a gear in engagement with said pinion and coaxial with the driven shaft, and a fixed housing, and a one-direction roller clutch bearing interposed between said gear and said housing.

6. A power transmission device comprising a driving element, a contact member rotatable with the driving element about the axis of the driving element and movable longitudinally with respect thereto, a mutor revoluble about an axis external to itself and having a contact head rotatable about an axis inclined with respect to the axis of revolution and movable longitudinally for engagement with said contact member, means to effect relative displacement of the contact head and the contact member, a reaction device in operative relation with the mutor, and a driven element in operative relation with the mutor.

7. A power transmission device comprising a driving element, a contact member rotatable with the driving element about the axis of the driving element and movable longitudinally with respect thereto, centrifugal devices in operative relation with the contact member to move the same longitudinally, a mutor revoluble about an axis external to itself and having a contact head rotatable about an axis inclined with respect to the axis of revolution and movable longitudinally for engagement with said contact member, means to effect relative displacement of the contact head and the contact member, a reaction device in operative relation with the mutor, and a driven element in operative relation with the mutor.

8. A power transmission device comprising a driving element, a contact member rotatable with the driving element about the axis of the driving element and movable longitudinally with respect thereto, centrifugal devices in operative relation with the contact member to move the same longitudinally in one direction, springs to move the contact member longitudinally in the opposite direction, a mutor revoluble about an axis external to itself and having a contact head rotatable about an axis inclined with respect to the axis of revolution and movable longitudinally for engagement with said contact member, a reaction device in operative relation with the mutor, and a driven element in operative relation with the mutor.

9. A power transmission device comprising a driving element, a driven shaft in axial alignment with the driving element, a contact member rotatable with the driving element about the driven shaft and movable longitudinally, a mutor revoluble about the axis of the driven shaft and having a contact head rotatable about an axis inclined with respect to the axis of the driven shaft and movable longitudinally for engagement with said contact member, means to effect relative displacement of the contact head and the contact member, a reaction device in operative relation with the mutor, and a driven element in operative relation with the mutor.

10. A power transmission device comprising a driving element, a driven shaft in axial alignment with the driving element, a contact member rotatable with the driving element about the driven shaft and movable longitudinally, a mutor revoluble about the axis of the driven shaft and having a contact head rotatable about an axis inclined with respect to the axis of the driven shaft and movable longitudinally for engagement with said contact member, centrifugal devices in operative relation with the contact member to move the same longitudinally, a reaction device in operative relation with the mutor, and a driven element in operative relation with the mutor.

11. A power transmission device comprising a driving element, a driven shaft in axial alignment with the driving element, a contact member rotatable with the driving element about the driven shaft and movable longitudinally, a mutor revoluble about the axis of the driven shaft and having a contact head rotatable about an axis inclined with respect to the axis of the driven shaft and movable longitudinally for engagement with said contact member, centrifugal devices in operative relation with the contact member to move the same longitudinally, a mutor carrier revoluble about the axis of the driven shaft, a coarsely threaded sleeve fixed to the mutor carrier, a coarsely threaded sleeve fixed to the driven shaft and in engagement with the first named sleeve, and a reaction device in operative relation with the mutor.

12. A power transmission device comprising a driving element, a contact member rotatable with the driving element about the axis of the driving element and movable longitudinally with respect thereto, centrifugal devices in operative relation with the contact member to move the same longitudinally in one direction, a spring to move the contact member longitudinally in the opposite direction, a mutor revoluble about the axis of the driving element and having a contact head rotatable about an axis inclined with respect to the axis of revolution and movable longitudinally, a spring coacting with the mutor head to press the same toward the contact member, a reaction device in operative relation with the mutor, and a driven element in operative relation with the mutor.

13. A power transmission device comprising a driving element, a contact member rotatable with the driving element about the axis of the driving element and movable longitudinally with respect thereto, centrifugal devices in operative relation with the contact member to move the same longitudinally in one direction, a spring to move the contact member longitudinally in the opposite direction, a mutor revoluble about the axis of the driving element and having a contact head rotatable about an axis inclined with respect to the axis of revolution and movable longitudinally, a spring coacting with the mutor head to press the same toward the contact member, a coarsely threaded sleeve fixed to the mutor, a second coarsely threaded sleeve in engagement with the first, a driving shaft to which the second sleeve is fixed, and a reaction device in operative relation with the mutor.

14. A power transmission device comprising a driving element, a contact member rotatable therewith, a mutor adapted to have driving contact with the contact member but normally out of contact therewith, said contact member and said mutor being relatively displaceable to vary the speed transmitted from one to the other and the torque, centrifugal devices to effect such relative displacement, a spring acting in opposition to the centrifugal devices, a reaction device in operative relation with the mutor, and a driven element in operative relation with the mutor.

15. A power transmission device comprising a driving element, a contact member rotatable therewith, a mutor adapted to have driving contact with the contact member but normally out of contact therewith, said contact member and said mutor being relatively displaceable to vary the speed transmitted from one to the other and the torque, centrifugal devices to effect such relative displacement, a spring acting in opposition to the centrifugal devices, a device acting in opposition to the centrifugal devices and comprising a coarsely threaded sleeve in operative relation with the mutor and a second coacting sleeve, a reaction device in operative relation with the mutor, and a driven element in operative relation with the second sleeve.

This specification signed this 26th day of April A. D. 1927.

CARL W. WEISS.